United States Patent [19]

Aberg

[11] 4,280,366
[45] Jul. 28, 1981

[54] GAS DRIVEN GYROSCOPE

[76] Inventor: Per Aberg, Döbelnsgatan 1, 111 40 Stockholm, Sweden

[21] Appl. No.: 974,654

[22] Filed: Dec. 22, 1978

Related U.S. Application Data

[63] Continuation of Ser. No. 729,137, Oct. 4, 1976, abandoned.

[30] Foreign Application Priority Data

Nov. 28, 1975 [SE] Sweden .............................. 7513458

[51] Int. Cl.³ ...................... G01C 19/12; G01C 19/20
[52] U.S. Cl. ........................................ 74/5.7; 74/5 R; 308/DIG. 1
[58] Field of Search ..................... 74/5 R, 5.7, 5.43; 308/DIG. 1

[56] References Cited

U.S. PATENT DOCUMENTS

| | | | |
|---|---|---|---|
| 2,174,777 | 10/1939 | Carter et al. | 74/5.43 |
| 2,445,388 | 7/1948 | Carlson | 74/5.43 |
| 2,695,198 | 11/1954 | Brugger | 74/5 R X |
| 3,187,588 | 6/1965 | Parker | 74/5.7 X |
| 3,276,270 | 10/1966 | Speen | 74/5.7 X |
| 3,577,788 | 5/1971 | Tischer | 74/5 R X |
| 3,763,708 | 10/1973 | Angele | 74/5.7 |
| 3,827,361 | 8/1974 | Zechnowitz | 74/5 R X |

Primary Examiner—Rodney H. Bonck
Attorney, Agent, or Firm—Haseltine and Lake

[57] ABSTRACT

A gas driven and gas lubricated gyroscope, especially for low pressure and vacuum operation, comprising a spherical rotor and spherical bearing formed by two bearing half parts joined along mating equatorial plane surfaces, at least one of the bearing half parts being provided with driving gas inlet channels formed into the equatorial surface. The bearing half parts also comprise spaces for draining the driving gas from the turbine blades of the rotor.

7 Claims, 1 Drawing Figure

U.S. Patent   Jul. 28, 1981   4,280,366
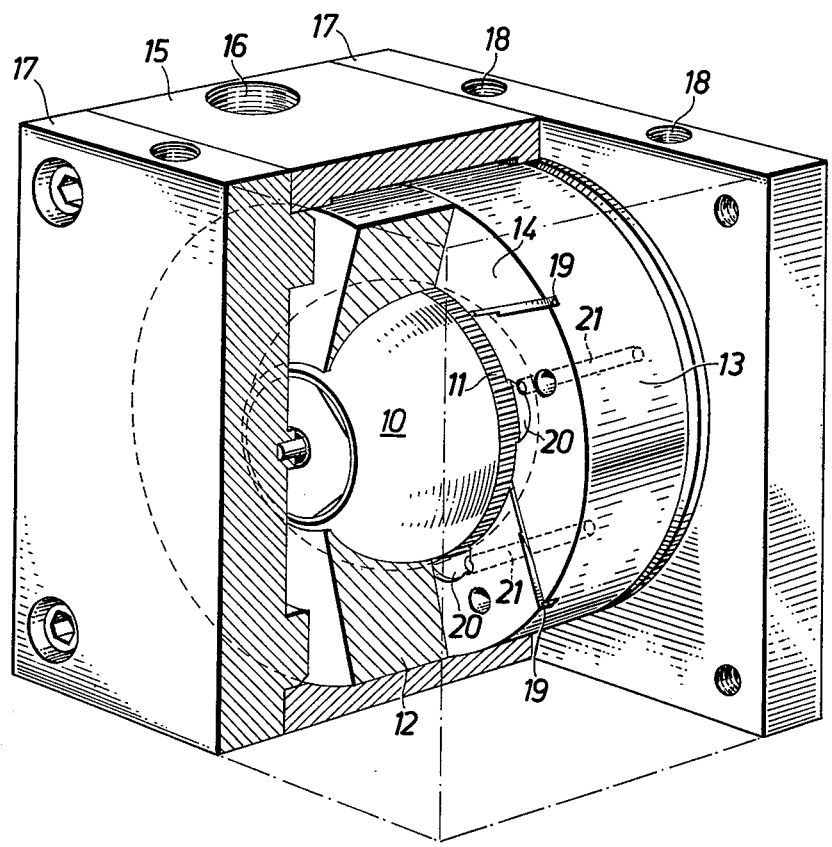

GAS DRIVEN GYROSCOPE

This is a continuation of application Ser. No. 729,137 filed Oct. 4, 1976, and now abandoned.

FIELD OF THE INVENTION

This invention relates to a gyroscope of the type which is provided with a rotor which is mounted in a gas bearing and is driven by a gas and is maintained without mechanical contact with the surrounding bearing. The gas usually consists of air.

BACKGROUND

Previously known gyroscopes of said type have not given the desired low operation deviations from a desired or set value, probably because previously known gyroscopes comprise a number of mutally different materials with different temperature expansion characteristics.

SUMMARY OF THE INVENTION

In order to achieve the highest possible precision in the accuracy of a gyroscope of the type mentioned above, the inventor has revealed that the following requirements should preferably be fulfilled;

1. The number of functional gyroscope details should be maintained as low as possible and the details should, as far as possible, be produced from the same materials or from materials with similar temperature expansion coefficients.
2. The operation temperature should be maintained constant. This applies also to the sensing means which normally are arranged close to the gyroscope rotor.
3. The speed of revolution of the gyroscope rotor should be maintained constant.
4. Any other interfering effects should be compensated as far as possible.

BRIEF DESCRIPTION OF THE DRAWING

A preferred embodiment of the gyroscope according to the invention is disclosed with reference to the drawing the sole FIGURE of which shows the gyroscope partly in section and with some parts which are common to this type of gyroscope omitted in order to improve the clarity.

DETAILED DESCRIPTION

A spherical rotor ball (10) with flat poles is provided along the equatorial part with grooves (11) which act as turbine blades against which the driving gas is blown. The rotor is enclosed in a spherical bearing which is formed by two bearing half parts (12, 13) which fit sealingly against each other along the equatorial plane (14) of the spherical surface. The rotor ball and the bearing half parts are enclosed in a bearing housing (15) which is provided with a tangentially directed gas inlet channel (16). The bearing housing closures (17) which fit sealingly against the bearing housing are provided with a space for electromagnetical, optical or other suitable sensing means and rotor directing means. Such means as well as other previously known means and measures which can be used together with gyroscopes and auxiliary equipment for gyroscopes are disclosed in the literature e.g. J. M. Slater, "Inertial guidance sensors", Reinhold Publishing Corp., N.Y. 1964, which together with the references stated in said publication are intended to constitute a part of this specification.

The bearing housing closures are provided with a circular drain channel which is arranged so that the driving gas which leaves the bearing of the rotor through a number of channels (21) passes said sensing means and then leaves the bearing housing closures (17) through outlet openings (18).

Because of the high dimensional accuracy and surface smoothness of the rotor and bearings which can be achieved according to the invention, the rotor ball will start at a very low pressure, less than 0.1 bar, and therefore the gyroscope is well suited for being operated with a vacuum source as the driving force.

The driving pressure of the driving gas may, for example, be varied from 0.1 to 7 bar and the driving gas is supplied to the rotor through 2 or more channels (19) which may be directed tangentially to the rotor ball surface and are formed or machined in one or both of the equatorial mating planes (14) of the bearing half parts (12, 13). The driving gas channels may have any suitable shape, such as spiral shape, diverging shape, venturi shape, etc. The channels may be machined by milling or sawing.

For draining the driving gas from the rotor turbine blades, a number of exhaust "pockets" (20) are preferably formed in the equatorial plane (14) of one or both bearing parts. Said pockets may be machined into the equatorial plane and extend in the radial direction outwardly from the spherical bearing surface mating the rotor and extend along a minor part of the periphery of the spherical bearing space in the equatorial plane. Preferably, the number of exhaust pockets corresponds to the number of driving gas channels (19).

From the driving gas draining means, especially exhaust pockets (20), one or more draining channels (21) extend to the outside of the bearing halves as explained above. Said channels may extend through one or both of the bearing halves.

The bearing housing (15) may, for example, on one or more of the outer surfaces be provided with a closely thermostat controlled heat source (22) which controls the temperature of the driving gas. In this way it is possible to prevent any water vapor present in the driving gas from being condensed or causing corrosion or other interfering influences on the operation of the gyroscope. In the same way, the temperature of the bearing housing with the bearing and the rotor and the temperature of the sensing and rotor directing means are controlled with the driving gas as a heat transfer medium.

The speed of revolution of the gyrorotor can be controlled by controlling the quantity and pressure of the driving gas, e.g. with an external device essentially comprising an electromagnetically controlled valve for the driving gas which can be controlled with a feedback signal from the sensing means of the gyrorotor for throttling the driving gas supply when the speed or rotation of the rotor exceeds a desired set value.

In the assembled state, the gyroscope forms a unit which through the arrangement of the gas inlet and outlet means and the entirely sealing enclosure of the co-operating functional parts of the gyroscope can form together with a driving gas source an entirely closed system which may also be used with a vacuum source connected to the driving gas exhaust from the gyroscope as the energizing source.

In order to fulfil the requirements as regards the dimensional accuracy of the gyroscope, a special process is preferably used for forming the spherical bearing half parts. Thus, besides size and shape accuracy it is necessary to pay special attention to the topography of the spherical surface, i.e. the profile depth and the profile type. In a first shaping step which preferably comprises machining, electrical or electrochemical forming or other forming methods with corresponding accuracy a dimensional accuracy, of about 0.05 mm. can be achieved. The final size accuracy with a surface profile depth of not above 0.001 mm. can be obtained by smooth grinding or lapping with a spherical ball or measuring sphere, preferably of steel, and suitable grinding medium, or by another suitable finishing method which gives a corresponding accuracy. When hard or brittle materials are used for the bearing half parts, e.g. beryllium, unconventional methods such as electrochemical working may be used for achieving the same result.

The inlet channels for the driving gas and the exhaust pockets can be formed in the equatorial planes of the bearing half to the desired depth and shape, e.g. by machining and/or electrical working (spark or electrochemical).

It has also been revealed that a stress relaxing heat treatment of the bearing and/or rotor of the gyroscope may improve the operation accuracy of the gyroscope. Said heat treatment can be performed one or more times at various stages of the forming and shaping process and also after assembly of the gyroscope, preferably at least before a final forming or shaping step comprising smooth or fine grinding or lapping, preferably with a spherical ball, and also optionally before, during and/or after other forming and shaping operations. This heat treatment or heat treatments which are preferably carried out to a temperature considerably above the highest intended operation temperature of the gyroscope can improve the operation accuracy of the gyroscope during extended use and also during use at varying temperatures. This is probably achieved by relieving stresses in the materials so that shape changes, especially of the mating surfaces of the bearing and the rotor but also of other parts of the gyroscope during extended use are prevented.

The bearing and the rotor ball are preferably made from a material which can easily be machined to a high dimensional accuracy and which is also sufficiently corrosion resistant, such as aluminum, brass, bronze, etc. The various parts of the gyroscope can also be made from very hard and/or chemically resistant materials, such as sintered carbides, ceramics, etc.

The driving gas may consist of air, freon, carbon dioxide, nitrogen or any other suitable and sufficiently inert gas, and can be recirculated from the exhaust opening to the inlet opening through a gas pressure source, such as a fan or gas compressor.

I claim:

1. A gas driven and gas lubricated gyroscope, especially for low pressure and vacuum operation, which comprises a bearing housing, and a rotor (10) of substantially spherical shape in said housing, said rotor having a series of turbine blade grooves (11) extending around the rotor along an equatorial part of the rotor, and two bearing surfaces of spherical curvature extending from the part of the rotor with the turbine blade grooves on each side of the rotor essentially to each pole of the rotor, said bearing surfaces of spherical curvature extending over the major portion of the rotor surface, said bearing housing having a bearing cavity with an internal bearing surface mating with the bearing surfaces of said rotor and extending over the major portion of the rotor surface with substantially the same extent as the bearing surfaces of the rotor, said bearing housing consisting of two bearing half parts (12, 13) which are joined along mating equatorial plane surfaces (14) coplanar with the equatorial part of the rotor, said bearing housing being provided with at least two driving gas channels (19) for blowing a driving gas against said turbine blade grooves on the rotor, said driving gas channels consisting of straight grooves provided in the equatorial plane surface (14) of at least one of the bearing half parts (12,13) extending essentially from the outer periphery of the equatorial surface to the inner periphery of said surface, in a substantially tangential direction with respect to the rotor, said bearing half parts also having spaces (20) for discharging the driving gas from the turbine blade grooves, and outlets (21) extending from said spaces outside of the bearing housing for discharge of the driving as from said spaces, said spaces consisting of pockets extending outwardly from the periphery of the bearing cavity in the equatorial plane surface of at least one of said bearing half parts, the number of said pockets being equal to the number of said inlet chanels (19) with one of said pockets arranged between each two of said inlet channels, said driving gas channels (19), turbine blade grooves (11) and outlet pockets (21) being arranged within a narrow annular zone proximate to the equatorial plane, said rotor and said bearing housing being constituted of materials having similar temperature expansion coefficients, the mating bearing surfaces of said rotor and said bearing housing having a spherical surface size accuracy of at least about 0.001 mm.

2. A gyroscope according to claim 1 in which said rotor and said bearing housing are in a heat treated condition obtained by at least one heating to a temperature substantially above the highest intended temperature of use of the gyroscope at least prior to a final smooth grinding of said mating bearing surfaces to the desired size accuracy.

3. A gyroscope according to claim 1 in which the rotor and the bearing housing are made of a material selected from the group consisting of aluminum, brass, bronze, beryllium, sintered carbides and ceramics.

4. A gyroscope according to claim 2 in which the rotor and the bearing housing are made of a material selected from the group consisting of aluminum, brass, bronze, beryllium, sintered carbides and ceramics.

5. A gyroscope according to claim 1 comprising an outer housing in which the bearing housing with the enclosed rotor are mounted, said outer housing being gas-tight and having a driving gas distribution space between said bearing housing and said outer housing for supplying the driving gas from a driving gas inlet opening (16) provided in said outer housing to the driving gas inlet channels (19) in said bearing housing.

6. A gyroscope according to claim 1 wherein said outlets are constituted as channels extending in at least one of said bearing half parts into communication with said pockets.

7. A gyroscope according to claim 6 wherein said channels extend parallel to the axis of rotation of the rotor.

* * * * *